US011119798B2

(12) United States Patent
Tshouva et al.

(10) Patent No.: US 11,119,798 B2
(45) Date of Patent: Sep. 14, 2021

(54) APPLYING CONTROL FLOW INTEGRITY VERIFICATION IN INTERMEDIATE CODE FILES

(71) Applicant: Sternum Ltd., Tel Aviv (IL)

(72) Inventors: Natali Tshouva, Rishon LeZion (IL); Lian Granot, Rishon LeZion (IL); Arik Farber, Tel Aviv (IL); Tal Granot, Tel Aviv (IL)

(73) Assignee: Sternum Ltd., Tel-Aviv (IL)

( * ) Notice: Subject to any disclaimer, the term of this patent is extended or adjusted under 35 U.S.C. 154(b) by 0 days.

(21) Appl. No.: 16/594,115

(22) Filed: Oct. 7, 2019

(65) Prior Publication Data

US 2020/0159553 A1     May 21, 2020

Related U.S. Application Data

(60) Provisional application No. 62/767,542, filed on Nov. 15, 2018.

(51) Int. Cl.
   *G06F 9/455*        (2018.01)
   *G06F 8/41*         (2018.01)
   (Continued)

(52) U.S. Cl.
CPC .......... *G06F 9/45508* (2013.01); *G06F 8/433* (2013.01); *G06F 9/3005* (2013.01);
(Continued)

(58) Field of Classification Search
CPC .... G06F 9/45508; G06F 8/433; G06F 9/3005; G06F 9/30098; G06F 9/3897; G06F 21/54; H04L 9/0643
See application file for complete search history.

(56) References Cited

U.S. PATENT DOCUMENTS 8,171,438 B2 *    5/2012    Ward ................... G06F 30/3323
                                                                                                                                       716/104
8,719,802 B2 *    5/2014    Maeda ..................... G06F 8/433
                                                                                                                                       717/132
(Continued)

FOREIGN PATENT DOCUMENTS

CN             103237901         8/2013
WO      WO 2013/048734        4/2013
(Continued)

OTHER PUBLICATIONS

Abadi, Martin, et al. "Control-flow integrity principles, implementations, and applications." ACM Transactions on Information and System Security (TISSEC) 13.1 (2009): 1-40. (Year: 2009).*

(Continued)

*Primary Examiner* — Matthew J Brophy

(57) ABSTRACT

A method of generating compiled intermediate code files adjusted to apply execution control flow verification comprising receiving intermediate code file(s) generated by a compiler which comprise a plurality of routines and adjusting the intermediate code file(s) prior to generating a respective executable file for execution by one or more processors. The adjustment comprising analyzing the intermediate code file(s) to identify valid execution path(s) describing order of execution of preceding routines executed prior to execution of each critical routine, adding registration code segment(s) configured to register execution of each routine in a runtime execution sequence, adding flow validation code segment(s) configured to verify the runtime execution sequence against the valid execution path(s) before invoking the critical routine(s) and outputting the adjusted intermediate code file(s). In runtime, in case the runtime execution sequence does not match a valid execution path(s), the flow validation (Continued)

code segment causes the processor(s) to initiate predefined action(s).

14 Claims, 2 Drawing Sheets

(51) Int. Cl.
   *G06F 9/30* (2018.01)
   *G06F 9/38* (2018.01)
   *H04L 9/06* (2006.01)
(52) U.S. Cl.
   CPC ........ *G06F 9/30098* (2013.01); *G06F 9/3897* (2013.01); *H04L 9/0643* (2013.01)

(56) References Cited

U.S. PATENT DOCUMENTS

| | | | | |
|---|---|---|---|---|
| 8,793,665 | B2* | 7/2014 | Murthy | G06F 8/315 717/132 |
| 8,875,109 | B2* | 10/2014 | Murthy | G06F 11/3604 717/132 |
| 9,063,721 | B2* | 6/2015 | Ghose | G06F 9/3877 |
| 9,721,120 | B2* | 8/2017 | McLachlan | G06F 21/125 |
| 2003/0023856 | A1* | 1/2003 | Horne | G06F 3/064 713/187 |
| 2008/0127106 | A1* | 5/2008 | Ward | G06F 8/75 717/127 |
| 2010/0146624 | A1* | 6/2010 | Meyer | G06F 21/54 726/23 |
| 2012/0084761 | A1* | 4/2012 | Maeda | G06F 8/20 717/132 |
| 2012/0093885 | A1 | 4/2012 | Sahoo et al. | |
| 2014/0082329 | A1* | 3/2014 | Ghose | G06F 9/3877 712/208 |
| 2014/0344924 | A1* | 11/2014 | McLachlan | G06F 21/629 726/22 |
| 2015/0007142 | A1* | 1/2015 | Biffle | G06F 21/54 717/126 |
| 2015/0370560 | A1* | 12/2015 | Tan | G06F 9/30058 717/148 |
| 2016/0078221 | A1* | 3/2016 | Kaplan | G06F 21/6245 726/25 |
| 2016/0300060 | A1* | 10/2016 | Pike | G06F 16/2365 |
| 2016/0331686 | A1 | 11/2016 | Polach et al. | |
| 2018/0101565 | A1* | 4/2018 | Pike | G06F 11/3604 |
| 2018/0260564 | A1* | 9/2018 | Porteboeuf | G06F 21/54 |
| 2019/0095613 | A1* | 3/2019 | Singh | G06F 21/52 |
| 2020/0143043 | A1* | 5/2020 | Hong | G06F 21/577 |

FOREIGN PATENT DOCUMENTS

| | | |
|---|---|---|
| WO | WO 2013/138427 | 9/2013 |
| WO | WO 2015/085096 | 6/2015 |
| WO | WO 2014/168548 | 4/2021 |

OTHER PUBLICATIONS

Zhang, Chao, et al. "Practical control flow integrity and randomization for binary executables." 2013 IEEE Symposium on Security and Privacy. IEEE, 2013. (Year: 2013).*

Zhang, Mingwei, and R. Sekar. "Control flow integrity for {COTS} binaries." 22nd {USENIX} Security Symposium ({USENIX} Security 13). 2013. (Year: 2013).*

Aktas, Erdem, Furat Afram, and Kanad Ghose. "Continuous, low overhead, run-time validation of program executions." 2014 47th Annual IEEE/ACM International Symposium on Microarchitecture. IEEE, 2014. (Year: 2014).*

Breslauer et al. "Real-Time Streaming String-Matching", Proceedings of the 22nd Annual Conference on Combinatorial Pattern Matching, CPM '11, Palermo, Italy, Jun. 27-29, 2011, p. 162-172, Jun. 27, 2011.

Zhang et al. "Control Flow Integrity for COTS Binaries", Proceedings of the 22nd USENIX Conference on Security, SEC '13, Washington, D.C., USA, Aug. 14-16, 2013, p. 337-352, Aug. 14, 2013.

European Search Report and the European Search Opinion dated Apr. 14, 2020 From the European Patent Office Re. Application No. 19201782.0. (7 Pages).

Notification of Office Action and Search Report dated Jun. 3, 2021 From the State Intellectual Property Office of the People's Republic of China Re. Application No. 19201782.0. (13 Pages).

Tendler et al. "p53 Protein Subcellular Localization And Apoptosis In Rodent Corneal Epithelium Cell Culture Following Ultraviolet Irradiation", International Journal of Molecular Medicine, 31(3):540-546, Jan. 16, 2013.

* cited by examiner

APPLYING CONTROL FLOW INTEGRITY VERIFICATION IN INTERMEDIATE CODE FILES

RELATED APPLICATION(S)

This application claims the benefit of priority under 35 USC § 119(e) of U.S. Provisional Patent Application No. 62/767,542 filed on Nov. 15, 2018, the contents of which are incorporated by reference as if fully set forth herein in their entirety.

FIELD AND BACKGROUND OF THE INVENTION

The present invention, in some embodiments thereof, relates to runtime verification of processor's control (execution) flow integrity, and, more specifically, but not exclusively, to adjusting intermediate code files to apply runtime verification of processor's control flow integrity.

In the constantly advancing and evolving computerized modern environment, cyber threats have become a major concern. Malicious parties may launch cyber-attacks against multiple platforms, applications and/or services in attempt to gain control over them for a plurality of goals and/or objectives ranging from harmless hacking through exploitation for financial gain all the way to malicious interference in critical systems.

These concerns may be dramatically intensified with the rapid deployment of a huge number of devices, typically small low end embedded devices used to support automation in a plurality of fields, areas and markets, for example, autonomous vehicles, smart cities, agriculture, medical care and medical procedures and/or the like. Such low end embedded devices may typically have limited resources which may be insufficient for applying sophisticated mitigation measures to counter such cyber threats.

However, these limited resources embedded devices may be involved in critical applications, services and/or the like and may optionally serve as access points to higher level platforms and systems. Embedded devices may therefore present a major security breach which may be exploited by malicious parties.

SUMMARY OF THE INVENTION

According to a first aspect of the present invention there is provided a computer implemented method of generating compiled intermediate code files adjusted to apply execution control flow verification, comprising:

Receiving one or more intermediate code files generated by a compiler, the intermediate code file(s) comprising a plurality of routines.

Adjusting the intermediate code file(s) prior to generation of a respective executable file to be executed by one or more processors, the adjusting comprising:

Identifying one or more valid execution paths leading to execution of one or more critical routines of the plurality of routines. Each of the valid execution path(s) identified by analyzing the intermediate code file(s) describes an order of execution of each preceding routine of the plurality of routines executed prior to execution of each critical routine.

Adding a registration code segment configured to register execution of each of the plurality of routines in a runtime execution sequence.

Adding a flow validation code segment configured to verify the runtime execution sequence against the valid execution path(s) before invocation of the critical routine(s).

Outputting the adjusted intermediate code file(s).

Wherein, in runtime, in case the runtime execution sequence updated by the registration code segment does not match one of the valid execution path(s), the flow validation code segment causes the processor(s) to initiate one or more predefined actions.

According to a second aspect of the present invention there is provided a system for generating compiled intermediate code files adjusted to apply execution control flow verification, comprising a program store storing a code and one or more constructing processors coupled to the program store for executing the stored code. The code comprising:

Code instructions to receive one or more intermediate code files generated by a compiler, the intermediate code file(s) comprising a plurality of routines.

Code instructions to adjust the intermediate code file(s) prior to generation of a respective executable file to be executed by one or more executing processors, the adjusting comprising:

Identifying one or more valid execution paths leading to execution of one or more critical routines of the plurality of routines. Each of the valid execution path(s) identified by analyzing the intermediate code file(s) describes an order of execution of each preceding routine of the plurality of routines executed prior to execution of each of the critical routine(s).

Adding a registration code segment configured to register execution of each of the plurality of routines in a runtime execution sequence.

Adding a flow validation code segment configured to verify the runtime execution sequence against the valid execution path(s) before invocation of each of the critical routine(s).

Code instructions to output the adjusted intermediate code file(s).

Wherein, in runtime, in case the runtime execution sequence updated by the registration code segment does not match one of the valid execution path(s), the flow validation code segment causes the executing processor(s) to initiate one or more predefined actions.

According to a third aspect of the present invention there is provided a computer program executable file generated from intermediate code files adjusted to support execution control flow verification, comprising:

A non-transitory computer readable storage medium.

First program instructions of a registration code segment created for each of a plurality of routines of an executable file generated from one or more intermediate code files adjusted to support execution control flow verification. The registration code segment is configured to register execution of the respective routine in a runtime execution sequence describing an order of runtime execution of each routine executed prior to execution of one or more critical routines of the plurality of routines.

Second program instructions of a flow validation code segment created for the critical routine(s) and configured to verify the runtime execution sequence against each of one or more valid execution paths before invocation of the critical routine(s). In case the runtime execution sequence updated by the registration code segment does not match any of the valid execution paths the flow validation code segment causes initiation of one or more predefined action. The valid execution path(s) describing an order of execution of each preceding routine executed prior to execution of each critical routine is identified during an analysis of the intermediate code file(s).

A plurality of program instructions each of a respective one of the plurality of routines to execute an original functionality of the plurality of routines as coded prior to the adjustment of the intermediate code file(s).

Wherein the first, second and the plurality of program instructions are executed by one or more processors from the non-transitory computer readable storage medium.

In a further implementation form of the first, second, and/or third aspects, each of the one or more intermediate code files is a member of a group consisting of: an object file, an archive file and a binary file.

In a further implementation form of the first, second, and/or third aspects, each of the plurality of routines is a member of a group consisting of: a routine, a sub-routine and a function.

In a further implementation form of the first, second, and/or third aspects, one or more the plurality of routines are identified by analyzing a symbol table of one or more of the intermediate code files to identify routine symbols.

In a further implementation form of the first, second, and/or third aspects, one or more of the valid execution paths are identified by analyzing a control flow graph generated for one or more of the intermediate code files.

In a further implementation form of the first, second, and/or third aspects, the verification of the runtime execution sequence is based on verification of an ordered sequence of unique identifiers assigned to each of the plurality of routines wherein:

Each of the valid execution path(s) comprises an ordered pattern concatenating the unique identifier of each preceding routine in order of execution.

The registration code segment is configured to append the unique identifier of each routine to an ordered pattern of the runtime execution sequence upon execution of the respective routine.

The flow validation code segment is configured to verify a match between the ordered pattern of the runtime execution sequence and the ordered pattern of at least one of valid execution path(s).

In an optional implementation form of the first, second, and/or third aspects, the runtime execution sequence is implemented as a siding window in which the ordered pattern of the runtime execution sequence comprises a reduced size ordered pattern concatenating the unique identifiers of a predefined number of routines most recently appended to the runtime execution sequence.

In an optional implementation form of the first, second, and/or third aspects, hash values matching is used for the verification by applying the following:

Each of the valid execution path(s) is expressed by a hash value calculated for the ordered pattern of the respective valid execution path using one or more rolling hash function.

The registration code segment is configured to calculate a rolling hash value for the reduced size ordered pattern of the runtime execution sequence using one or more of the rolling hash function.

Wherein the flow validation code segment is configured to verify a match between the rolling hash value calculated for the runtime execution sequence and the hash value calculated for each of the one or more valid execution paths.

In a further implementation form of the first, second, and/or third aspects, one or more of the critical routines are manually defined as critical by one or more experts. The expert is a member of a group consisting of: a developer, an operator and a user.

In a further implementation form of the first, second, and/or third aspects, one or more of the critical routines are automatically defined as critical based on the analysis of one or more of the intermediate code files.

In a further implementation form of the first, second, and/or third aspects, each of the one or more predefined actions is a member of a group consisting of: crashing execution of one or more of the processor(s), halting execution of one or more of the processor(s), causing one or more of the processor(s) to branch to a predefined address in the intermediate code file(s), preventing one or more of the processor(s) from executing one or more of the critical routines and generating an indication of an invalid execution path.

In a further implementation form of the first, second, and/or third aspects, the registration code segment and the flow validation code segment are added to one or more of the intermediate code files by replacing a branch instruction to one or more of the plurality of routines with a trampoline branch function configured to invoke the respective added code segment before invocation of the respective routine(s).

In a further implementation form of the first, second, and/or third aspects, the registration code segment and the flow validation code segment are added to one or more of the intermediate code files by inserting a trampoline branch function in one or more of the of the plurality of routines. The trampoline branch function is configured to invoke the respective added code segment from within the respective routine(s).

In a further implementation form of the first, second, and/or third aspects, one or more of the intermediate code files are adjusted to amend one or more of: an instruction and a data element affected by the addition of the added code segments.

In a further implementation form of the first, second, and/or third aspects, one or more of the intermediate code files are amended to update their symbol table(s) to reflect the added code segments and an increase to size of the adjusted routines.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
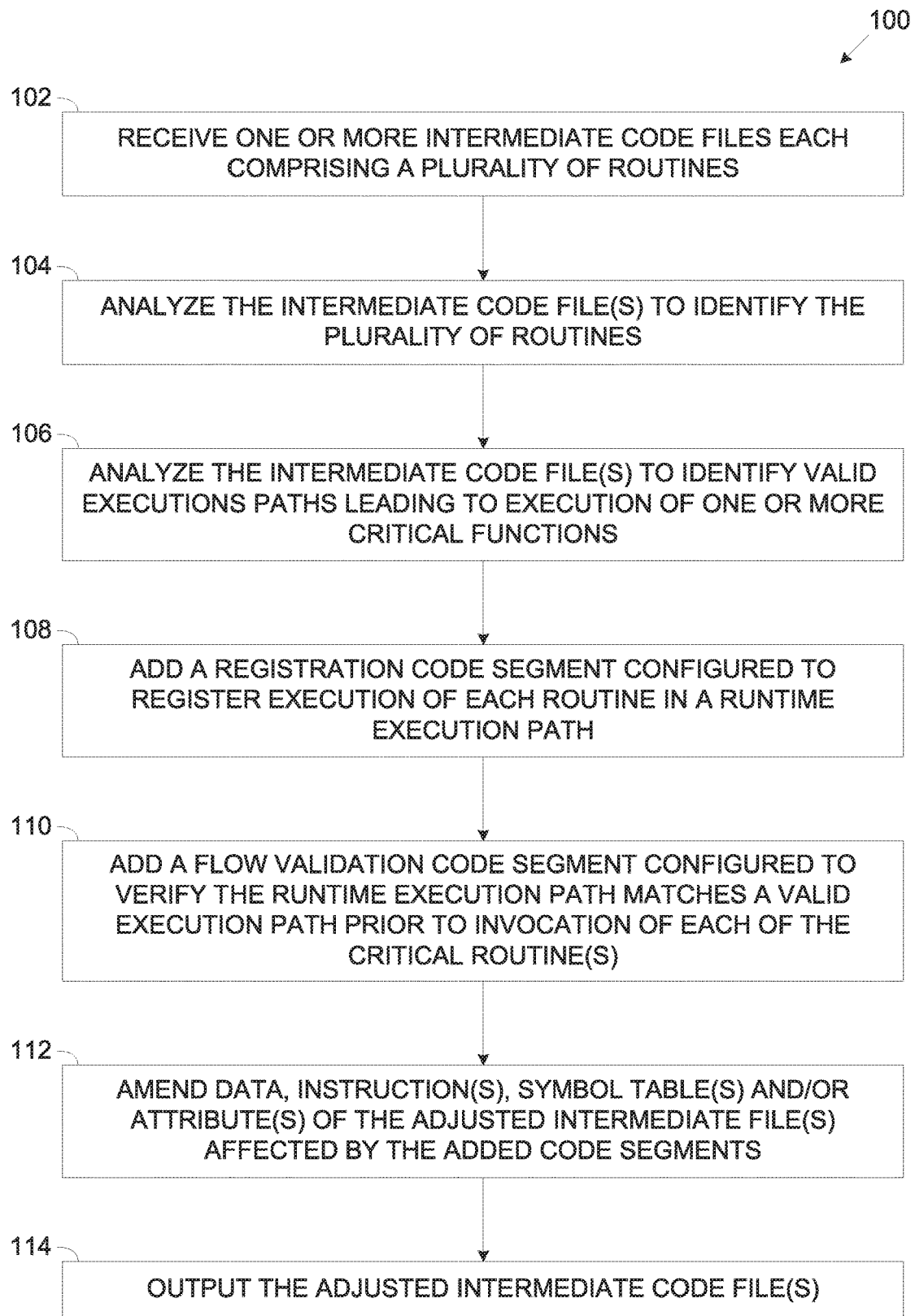
FIG. 1 is a flowchart of an exemplary process of adjusting intermediate code files to apply runtime verification of processor's control flow integrity, according to some embodiments of the present invention.

The present invention, in some embodiments thereof, relates to runtime verification of processor's control (execution) flow, and, more specifically, but not exclusively, to adjusting intermediate code files to apply runtime verification of processor's control flow.

According to some embodiments of the present invention, there are provided methods, systems and computer program products for adjusting one or more intermediate code files, for example, an object file, a binary file, a library file, an archive file and/or the like generated from one or more source code files by one or more compilers to include additional code configured to verify Control (execution) Flow Integrity (CFI) in the intermediate code file(s). The intermediate code file(s) comprising a plurality of routines, sub-routines, functions and/or the like collectively designated routine herein after are adjusted prior to being used for generation, for example, build, linkage and/or the like of one or more executable files. The executable file(s) may be executed by one or more processors of one or more devices, systems and/or platforms collectively designated device herein after.

Malware (malicious code), for example, a computer virus, a worm, a Trojan horse, a ransomware, a spyware, an adware, a scareware and/or the like may be used by a potentially malicious party(s) to gain control over the processor(s)' control (execution) flow. The malware may apply one or more security exploits, for example, buffer overflow, buffer overrun and/or the like in attempt to divert the processor(s) from its originally planned execution path to an alternate execution path. The alternate execution path may naturally compromise the processor(s) operation and may cause unintended behavior and/or operation of the processor(s) that may lead to severe and potentially hazardous actions, outputs and/or results.

One of the most prominent and robust mitigation measures applied to prevent gaining control over the execution flow of the processor(s) is verifying CFI in runtime. The CFI, i.e. the execution flow, of the processor(s) may be verified prior to execution of one or more routines, in particular critical routines. A critical routine, when executed, may compromise an intended behavior of the device in a way that may lead to potentially hazardous, dangerous and/or harmful consequences and/or results. In particular, routines may be regarded and/or defined as critical in case the compromised intended behavior relates to interaction with one or more other parties, for example, people (e.g. user, patient, operator, etc.), devices, systems and/or the like such that the compromised intended behavior may affect, impact and/or harm the other party(s). One or more of the critical routines may be manually defined as such by one or more users, experts, operators and/or the like. Additionally and/or alternatively, one or more of the critical routines may be automatically defined as such based on an analysis of the intermediate code file(s).

In order to apply the CFI verification in the intermediate code file(s), one or more of the routines in the intermediate code file(s) may be adjusted to include CFI verification logic (code) adapted to verify in runtime that the execution flow (path) of the processor(s) is valid. This may be done by analyzing the intermediate code file(s) to identify valid executions paths (flows), in particular execution paths leading to execution of one or more critical routines. The identified valid execution paths may be predefined as valid in one or more valid execution datasets associated with the intermediate code file(s) configured to be accessible during runtime. During runtime, in particular prior to execution of one of the critical routines, the current execution path may be compared against the predefined valid execution paths to verify that the current execution path is valid and not altered by a malware in attempt to compromise the operation of the processor(s).

Each of the intermediate code file(s) may be analyzed to identify the plurality of routines. Each intermediate code file may be further analyzed to identify one or more valid executions paths, in particular valid executions paths leading to execution of one of the critical routine(s). Each of the valid executions paths may describe a respective order of execution of one or more preceding routines executed prior to execution of a critical routine. For example, a Control flow Graph (CFG) may be generated for the intermediate code file(s) to identify the valid executions path(s) and the preceding routine(s). In order to identify each of the valid execution path(s), each of the plurality of routines may be assigned with a unique identifier such that each of the valid execution path(s) may be represented by a respective ordered pattern concatenating the unique identifiers of the preceding routines identified to execute along the respective valid execution path. Moreover, each of the valid execution path(s) may be represented by a hash value calculated for the respective ordered pattern concatenating the unique identifiers of the preceding routine(s) identified along the respective valid execution path. In particular, the hash value may be calculated using one or more rolling hash functions.

The intermediate code file(s) may be adjusted to include a registration code segment configured to register each of the plurality of routines in a runtime execution sequence upon execution of the respective routine. In particular, the registration code segment may be configured to register the respective routine by appending the unique identifier of the respective routine to the runtime execution sequence. During runtime, the runtime execution sequence constructed by the registration code segments may therefore comprise an ordered pattern concatenating the unique identifiers of the registered routines. However, during runtime the execution path may become extremely long such that it may be inefficient and potentially impossible to log and track all executed routines in the runtime execution sequence. The runtime execution sequence may be therefore implemented as a sliding window comprising the unique identifiers of a predefined number of routines most recently executed and hence most recently registered. The registration code segment may therefore be configured to discard the unique identifier of a least recent (oldest) registered routine from the beginning of the windowed runtime execution sequence when registering another routine by appending its unique identifier to the end of the windowed runtime execution sequence. This is the done in steady state after the runtime execution sequence sliding window reached its maximum size, i.e. the predefined number of routines. Prior to the steady state while the windowed runtime execution sequence is still not fully filled, the registration code segment may simply append the unique identifier of the executed routine to the end of the windowed runtime execution sequence without removing the unique identifier of previously registered routine(s). The predefined number of routines may be set, for example, according to the number of routines identified in one or more of the valid execution path(s), according to a complexity of execution of the code, according to resource capabilities of the target processor(s) and/or the like.

Moreover, the runtime execution sequence may be expressed by a rolling hash value calculated for the predefined number of most recently registered routines using the rolling hash function(s) used to calculate the rolling hash value(s) of the valid execution path(s). The rolling hash value of the runtime execution sequence may be calculated and constantly updated for the unique identifiers of the current most recently registered routines. Optionally, in particular in case multiple valid execution paths comprise different numbers of preceding routines, the runtime execution sequence may be expressed by respective multiple rolling hash values each calculated for a different predefined number of most recently registered routines.

The intermediate code file(s) may be adjusted to include a flow validation code segment configured to verify, prior to invocation of one or more of the critical routines, that the runtime execution path (control flow) of the processor(s) executing the executable file(s) generated using the adjusted intermediate code file(s) is valid. The flow validation code segment may verify the runtime execution path by checking for a match between the runtime execution sequence and the valid execution path(s) predefined in the valid execution dataset for the respective critical routine. In case the runtime execution sequence matches one of the valid execution path(s) associated with the respective critical routine, the flow validation code segment determines the runtime execution path is valid. On the other hand, in case the runtime execution sequence does not match any of the valid execution path(s) associated with the respective critical routine, the validation code segment may determine that the runtime execution path is invalid and that the processor(s)' control flow may be compromised.

The flow validation code segment may verify the runtime execution sequence by matching between the ordered pattern of the runtime execution sequence, specifically the ordered pattern of the sliding window comprising the unique identifiers of the predefined number of most recently executed routines and the ordered pattern(s) of the valid execution path(s). For example, the flow validation code segment may be configured to apply one or more pattern matching methods, technique and/or algorithms for matching the runtime execution sequence to the ordered patterns of the valid execution path(s). In particular, in case of expressing the valid execution path(s) and the runtime execution sequence using the rolling hash values, the flow validation code segment may be configured to match between the rolling hash value calculated for the runtime execution sequence, in particular for the predefined number of most recently executed routines and the hash value(s) calculated for each of the valid execution path(s).

The added code segments, i.e. the registration and flow validation code segments typically comprise very simple logic implemented by a limited and significantly small number of instructions thus having a very small footprint requiring insignificant storage resources and/or computing resources.

During runtime, the registration code segment may register each of the plurality of routines in the runtime execution sequence upon invocation and/or execution of the respective routine by appending the unique identifier of the respective routine to the runtime execution sequence. As such, the runtime execution sequence is constantly maintained and updated during runtime by each routine which is invoked (executed). As described herein before, in case the runtime execution sequence sliding window comprises the predefined number of routines, the registration code segment may adjust the runtime execution sequence to discard the unique identifier of a least recent (oldest) routine when appending the unique identifier of the currently registered routine. Moreover, the registration code segment may calculate a new rolling hash value for the new sliding window of the runtime execution sequence.

Prior to invocation of each critical routine, the flow validation code segment may compare the runtime execution sequence to the valid execution path(s) predefined for the respective critical routine in the valid execution dataset. Based on the comparison, the flow validation code segment may determine whether the execution flow of the processor(s) prior to invoking the respective critical routine includes the preceding routines executed in the order defined by the valid execution path identified for the respective critical routine in the valid execution dataset. The flow validation code segment may further verify all preceding routines identified in the respective valid execution path are indeed executed in order and no additional routine(s) are inserted.

In particular, as described herein before, the flow validation code segment may apply one or more pattern matching techniques to match between the rolling hash value calculated for the runtime execution sequence, in particular for the predefined number of most recently executed routines and the hash value(s) calculated for each of the valid execution path(s). In case the flow validation code segment determines that the runtime execution path is valid, the flow validation code segment may invoke and/or cause invocation of the respective critical routine. However, in case the validation code segment determines that the runtime execution path is invalid, the validation code segment may initiate one or more predefined actions directed to prevent and/or indicate of the compromised execution flow. The predefined actions may include for example, crashing execution of the processor(s), halting execution of the processor(s), causing the processor(s) to branch to a predefined address, preventing the processor(s) from executing the critical routine, generating one or more indications and/or alerts of invalid execution and/or the like. The predefined actions may be selected according to one or more parameters of the execution flow, for example, the processor architecture, a severity and/or criticality of each routine, a user defined parameter and/or the like.

Applying the runtime flow control verification by adjusting the intermediate code file(s) in post-compilation phase may present significant advantages and benefits compared to existing methods and systems for incorporating flow control verification measures into the code.

First, the CFI verification measures are applied in the intermediate code files compared to the existing methods which may be able to apply such verification measures in source code files. Therefore, in contrast to the existing methods, the CFI verification measures may be applied to intermediate code files for which the source code is not available, for example, $3^{rd}$ party intermediate code files, library files, and/or the like.

Moreover, limiting the CFI verification to verify execution paths leading only to selected critical routines may significantly reduce the computing resources required for the CFI verification, for example, processing power, processing time, storage capacity and/or the like. The selective CFI verification may therefore be highly applicable for a wide range of computing devices, systems and/or platforms, in particular low end and/or limited resources devices, for example, embedded devices, IoT devices, medical devices and/or the like which have limited computing resources. This is in contrast to the existing methods which may apply CFI verification measures for verify that branch operations (invocation) comply with expected valid branch operations as identified in the code file(s). Verifying every branch operation may require excessive computing resources and may therefore not be applicable for multiple segments of processing devices, systems and/or applications, in particular the low end and typically limited resources devices.

Furthermore, the CFI verification measures, i.e. the added code segments comprise very simple logic and a limited low number of instructions thus requiring very limited and typically insignificant processing and/or storage resources for their execution and/or storage. As such the applied CFI verification measures may highly suitable for the low end and/or typically limited resources devices.

In addition, some of the existing methods may require operating system resources for applying the CFI verification measures, for example, dynamically loadable code modules, system calls, interrupt handlers, and/or the like. Such dynamically loadable code modules may not be available for a plurality of computing devices, systems and/or platforms in particular the low end and/or limited resources devices. In contrast, applying the CFI verification measures through adjustment of the routine(s) in the intermediate code file(s) is independent of such requirements and/or prerequisite and is therefore oblivious and agnostic of the operating system, hardware features, architecture specifics and/or the like. This may allow applying the verification measures to practically any type of intermediate code file used to generate executable files ranging from simple single binary file firmware to complex operating systems.

Also, the pattern matching techniques and/or algorithms used for matching the ordered patterns of the runtime execution sequence and the valid execution path(s), specifically for matching the respective hash values may be highly efficient in terms of storage resource, computing (matching) time and/or computing resources. Therefore, the storage resources required for storing the valid execution dataset and/or the runtime execution sequence may be significantly reduced. Moreover, the computation overhead required for applying the flow validation code which uses pattern matching may be significantly low and typically insignificant. Furthermore, using the rolling hash functions for calculating the rolling hash value of the runtime execution sequence may significantly reduce the computing resources required to maintain an updated rolling hash value for the constantly updating sliding window of the runtime execution sequence. This is since the updated rolling hash value may be calculated using only the previous rolling hash value, the appended unique identifier and the discarded unique identifier. As such there is no need to re-calculate the hash value for the entire reduced size ordered pattern of the windowed runtime execution sequence comprising a plurality of unique identifiers of all routines executed to this point in time.

Lastly, applying the CFI verification measures in the intermediate code files may require no change, modification, alteration and/or adaptation to the development environment as may be required by the existing methods. Since development environments comprising one or more tools, for example, tool chain, compiler, linker, builder and/or the like may be significantly complicated adjusting them may require significant resources and/or time thus rendering the existing methods costly, inefficient and/or limited. In contrast, the CFI verification measures applied in the adjusted intermediate code file(s) may be easily integrated into existing development environment(s) and software package builds with no impact to the developer's environment. For example, the tool(s) and/or procedures required for generating and adding the added code segments may be invoked by adding one or more entries (lines) in one or more build and/or link configuration files, for example, a makefile and/or the like. Moreover, since the CFI verification measures are applied in the intermediate code files and hence not impacting the developer's tool chain, the developer does not need to be trained to use a modified tool chain as may be required in the existing methods.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer Program code comprising computer readable program instructions embodied on a computer readable medium may be transmitted using any appropriate medium, including but not limited to wireless, wire line, optical fiber cable, RF, etc., or any suitable combination of the foregoing.

The program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code can be downloaded to respective computing/processing devices from a computer readable storage medium or to an external computer or external storage device via a network, for example, the Internet, a local area network, a wide area network and/or a wireless network.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 illustrates a flowchart of an exemplary process of adjusting intermediate code files to apply runtime verification of processor's control flow integrity, according to some embodiments of the present invention. An exemplary process 100 may be executed for adjusting one or more intermediate code files, for example, an object file, a binary file, a library file, an archive file and/or the like generated from one or more source code files by one or more compilers to include code configured to apply runtime verification of Control Flow Integrity (CFI) in the intermediate code file(s). The intermediate code file(s) comprising a plurality of routines, sub-routines, functions and/or the like collectively designated routine herein after are adjusted prior to being used for generation, for example, build, linkage and/or the like of executable file(s) created for execution by one or more processors of one or more devices.

As described herein before, in runtime a malware may apply one or more security exploits to gain control over the processor(s)' execution flow and divert the execution flow from its original execution path thus compromising the processor(s) and potentially leading to unintended operation and/or behavior of the device. In order to apply the CFI, the intermediate code file(s) may be adjusted to include CFI verification logic adapted to identify deviation from valid execution path(s) and prevent the malware from taking control over the processor(s)' control (execution) flow.

Figure 2:
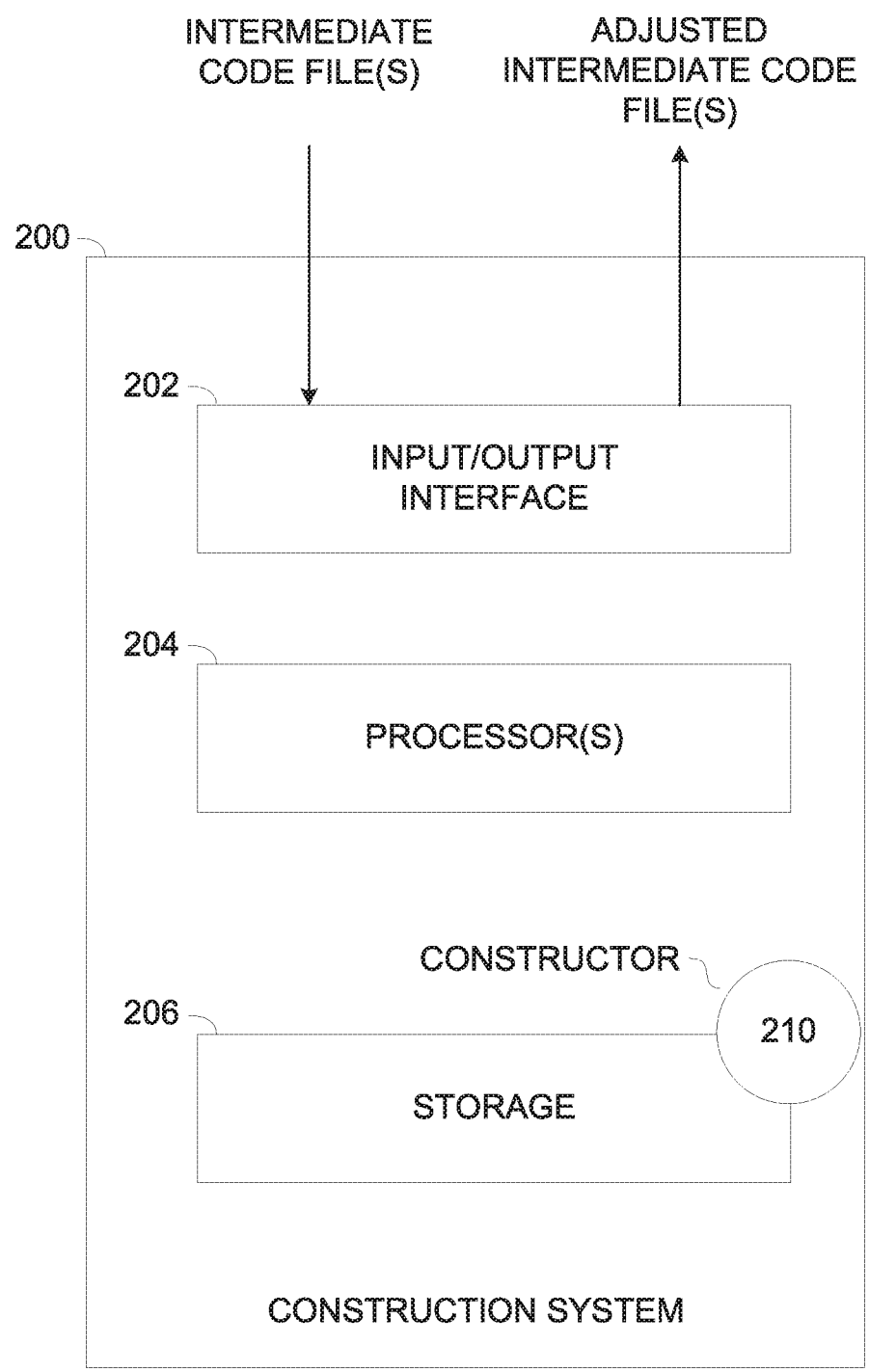
FIG. 2 is a schematic illustration of an exemplary system for adjusting intermediate code files to apply runtime verification of processor's control flow integrity, according to some embodiments of the present invention.

Reference is also made to FIG. 2, which is a schematic illustration of an exemplary system for adjusting intermediate code files to apply runtime verification of processor's control flow integrity, according to some embodiments of the present invention. An exemplary construction system 200, for example, a computer, a server, a computing node, a cluster of computing nodes and/or the like may include an Input/Output (I/O) interface 202, a processor(s) 204 for executing a process such as the process 100 and a storage 206 for storing code and/or data.

The I/O interface 202 may include one or more network interfaces for connecting to one or more wired and/or wireless networks, for example, a Local Area Network (LAN), a Wide Area Network (WAN), a Municipal Area Network (MAN), a cellular network, the internet and/or the like. The I/O interface 202 may further include one or more interfaces, for example, a Universal Serial Bus (USB), an attachable storage interface and/or the like for connecting to one or more local resources, for example, an external disk drive, another computing device and/or the like.

The processor(s) 204, homogenous or heterogeneous, may include one or more processing nodes arranged for parallel processing, as clusters and/or as one or more multi core processor(s). The storage 206 used for storing data and/or program code may include one or more non-transitory memory devices, either persistent non-volatile devices, for example, a hard drive, a solid state drive (SSD), a magnetic disk, a Flash array and/or the like and/or volatile devices, for example, a Random Access Memory (RAM) device, a cache memory and/or the like. The storage 206 may further comprise one or more local and/or remote network storage resources, for example, a storage server, a Network Attached Storage (NAS), a network drive, and/or the like accessible via one or more networks through the I/O interface 202.

Through the I/O interface 202, the construction system 200 may obtain, for example, receive, fetch and/or retrieve one or more intermediate code files generated by one or more compilers from one or more source code files. The construction system 200 may obtain the intermediate code file(s) from one or more remote network resources, for example, a server, a processing node, a storage server, a NAS, a cloud service, cloud storage and/or the like. Additionally and/or alternatively, via the I/O interface 202, the construction system 200 may obtain the intermediate code file(s) from a locally attached storage resource, for example, an attachable storage media, another computing node and/or the like. The construction system 200 may optionally locally store the obtained intermediate code file(s) in the storage 206.

The processor(s) 204 may execute one or more software modules, for example, a process, a script, an application, an agent, a utility, a tool and/or the like each comprising a plurality of program instructions stored in a non-transitory medium such as the storage 206 and executed by one or more processors such as the processor(s) 204. For example, the processor(s) 204 may execute an analysis and construction application (constructor) 210 for adjusting the intermediate code file(s) to apply the control flow runtime verification. Optionally, the constructor 210 may be integrated and/or invoked in one or more development environments comprising one or more tools, for example, a tool chain, a compiler, a linker, a builder and/or the like. For example, the constructor 210 may be invoked by adding one or more entries (lines) in one or more build and/or link configuration files, for example, a makefile and/or the like.

Optionally, the construction system 200 and/or the constructor 210 are provided by one or more cloud computing services, for example, Infrastructure as a Service (IaaS), Platform as a Service (PaaS), Software as a Service (SaaS) and/or the like provided by one or more cloud infrastructures and/or services such as, for example, Amazon Web Service (AWS), Google Cloud, Microsoft Azure and/or the like.

As shown at 102, the process 100 starts with the constructor 210 obtaining one or more intermediate code files, for example, an object file, a binary file, a library file, an archive file and/or the like may be generated by one or more compilers from one or more source code files. The intermediate code file(s) may be obtained in one or more file formats, for example, Executable and Linkable Format (ELF) and/or the like. The intermediate code file(s) may typically be used for generating, building and/or linking one or more executable files which may be executed by one or more processors.

The constructor 210 may obtain the intermediate code file(s) from one or more sources, for example, the remote network resource(s), the attachable storage device and/or the storage 206.

As shown at 104, the constructor 210 may apply one or more intermediate code files analysis tools to analyze each of the intermediate code file(s) to identify all the routines of the intermediate code file. For example, the constructor 210 may utilize "pyelftools", which is a python tool (library) for analyzing and parsing ELF files. Using the "pyelftools" tool, the constructor 210 may scan the symbol table of intermediate file(s) in ELF format to identify routines' symbols, and detect the routines' addresses in their respective code sections. The constructor 210 may be adapted to analyze the intermediate code file(s) according to the architecture and instruction set of the processor(s) targeted by the intermediate code file(s) are complied, for example, ARM, ARM-Thumb, x86, x86-64, power ISA and/or the like.

For example, the constructor 210 may identify the routines by iterating over a symbol table of the intermediate code file to identify and map the symbols generated by the compiler(s) for each of the routines in the intermediate code file. For example, in the ARM-Thumb architecture each .o object (intermediate) file may be implemented, for example, in the ELF file format. The constructor 210 may therefore identify the routines symbols' names by iterating over the entries in the "symbol table" section assigned with the extension ".symtab" in the ELF standard. The symbol table comprises information required for locating and relocating program's symbolic definitions and references. Each symbol entry associated with one of the routines in the symbol table is characterized by having a non-zero size field, a type TUNC' field and an Index field which references one of the "code" sections in the .o object (intermediate) file. One or more of the symbol table entries may further include a bind 'GLOBAL' field and/or a bind 'LOCAL' field.

The constructor 210 may further analyze each of the intermediate code file(s) to identify a beginning address of each of the routines in the intermediate code file. For example, in the ARM-Thumb architecture, the value of the "Function" (routine) symbol in the symbol table is "beginning of function (routine)+1" to specify that the function contains Thumb code. In such case, and optionally in similar cases for other processor architectures, the constructor 210 may extract the routine "value" from the symbol table of an .o object (intermediate) file and perform the opposite mathematical operation to extract the actual beginning address of the routine, i.e. "value −1".

As shown at 106, the constructor 210 may analyze each of the intermediate code file(s) to identify valid execution paths leading to one or more critical routines. Each valid execution path may describe an order of execution of one or more preceding routines executed prior to execution of one of the critical routine(s). The constructor may identify the valid execution path(s) by analyzing a plurality of execution paths possible in the intermediate code file(s) and detect those execution paths leading to the routine(s) defined as critical.

In order to identify the execution paths possible in the intermediate code file(s), the constructor 210 may analyze a Control Flow Graph (CFG) created for the intermediate code file(s) using one or more intermediate code files analysis tools, for example, IDA, angr and/or the like.

A critical routine, when executed, may compromise an intended behavior of the device executing an executable file generated from the intermediate code file(s) in a way that may lead to potentially hazardous, dangerous and/or harmful consequences and/or results. In particular, the compromised intended behavior may relate to interaction of the device with one or more other parties, for example, people (e.g. user, patient, operator, etc.), devices, systems and/or the like such that the compromised intended behavior may affect, impact and/or harm the other party(s). For example, assuming the executable file is executed by a processor(s) controlling operation of an insulin pump. In such case routine(s) which controls insulin injection may be defined as critical. In another example, assuming the executable file is executed by a processor(s) controlling operation of a heart pacemaker. In such case routine(s) which controls electric pulse generation may be defined as critical. In another example, assuming the executable file is executed by a processor(s) controlling operation of a vehicle breaking system. In such case routine(s) which initiate breaking instructions to the vehicle's breaks may be defined as critical.

The critical routine(s) may be manually defined by one or more experts, for example, a developer, an operator, a user and/or the like familiar with the intended applicability, functionality and/or behavior of the routines in the intermediate code file(s). Additionally and/or alternatively, one or more of the critical routines may be automatically defined as such based on the analysis of one or more of the intermediate code file(s). For example, the constructor 210 may identify one or more routines which interact with one or more I/O and/or communication interfaces of the device executing the executable file generated using the intermediate code file(s). In another example, the constructor 210 may identify one or more routines which are executed as consequence of execution of a plurality of other routines. Being executed following a long execution chain may be indicative of the routine(s) being highly significant to the operation of the device executing the executable file generated using the intermediate code file(s) and it may therefore be assumed and/or estimated that this routine(s) is critical to the proper operation of the device.

After the critical routine(s) are defined, the constructor 210 may analyze the CFG created for the intermediate code file(s) to identify all possible execution paths leading to execution of each of the critical routine(s) and mark them as valid. For example, the constructor 210 may create a valid execution dataset, for example, a list, a table, a record and/or the like mapping the identified valid execution path(s) leading to execution of the critical routine(s). For example, the valid execution dataset may include one or more entries each mapping a respective one of the identified valid execution path(s). Moreover, the valid execution path in each of the entries indicates an order of execution of the preceding routine(s) executed along the respective valid execution path prior to execution of the respective critical routine mapped by the respective entry.

Mapping the order of execution of the preceding routine(s) for each of the valid execution path(s) leading to execution of one of the critical routine(s) may be done for example, by assigning each of the plurality of routines identified in the intermediate code file(s) with a unique identifier. For example, the unique identifier assigned to each routine may be the address of the respective routine which is naturally unique for each routine. The constructor 210 may thus construct the valid execution dataset such that each of the entries includes a respective ordered pattern of a respective valid execution path which concatenates the unique identifiers of the preceding routines in their order of execution along the respective valid execution path mapped by the respective entry.

Optionally, in order to reduce storage resources for storing the valid execution dataset, the ordered pattern of the valid execution path(s) mapped by the respective entries in the valid execution dataset may be expressed by a hash value calculated by the constructor 210 using one or more hash functions. For example, assuming the unique identifier assigned to each routine is the address of the respective routine, the constructor 210 may calculate a unique hash value for each preceding routine by applying the hash function(s) to the address of the respective preceding routines. Moreover, in order to support efficient pattern matching and reduce computing resources and effort for runtime hash calculation as described herein after, the hash value calculated for the ordered pattern of each valid execution path may be calculated using one or more rolling hash functions.

The constructor 210 may adjust the intermediate code file(s) to include the valid execution dataset mapping the valid execution path(s). Additionally and/or alternatively, the constructor 210 may include the valid execution dataset in one or more additional intermediate code files which may be provided together with the adjusted intermediate code file(s) for the generation, build and/or linkage of the executable file(s). The constructor 210 may configure the adjusted intermediate code file(s) and/or the additional intermediate code file(s) to store the valid execution dataset in a volatile memory resource and/or in a non-volatile memory resource during runtime. The constructor 210 may apply this by creating, updating and/or modifying one or more configuration files used for the generation, build and/or linkage of the executable file(s), for example, a makefile, an allocation file and/or the like.

As shown at 108, the constructor 210 may adjust the intermediate code file(s) include a registration code segment configured to register execution of each of the plurality of routines identified in the intermediate code file(s) in a runtime execution sequence. The runtime execution sequence may be stored in a runtime dataset, for example, a structure, a record, a list, a table and/or the like.

For each of the routines, the constructor 210 may configure the registration code segment to register, during runtime, execution of the respective routine by updating the runtime execution sequence. For example, assuming each of the routines is assigned with the unique identifier, the registration code segment may be configured to register execution of the respective routine by appending the unique identifier of the respective routine to the end of the runtime execution sequence. The runtime execution sequence constructed during runtime by the registration code segments may therefore comprise an ordered pattern concatenating the unique identifiers of the executed and registered routines.

However, during runtime, the execution path may become extremely long such that it may be inefficient and potentially impossible to log and track all executed routines in the runtime execution sequence. The constructor 210 may therefore configure the registration code segment to implement the runtime execution sequence as a sliding window comprising a reduced size ordered pattern concatenating the unique identifiers of a predefined number of routines most recently executed and hence most recently registered. The size of the sliding window, i.e. the predefined number of routines logged in the runtime execution sequence may be set according to one or more parameters, for example, the number of preceding routines identified in the valid execution path(s), complexity of execution of the code, resources capabilities of the target processor(s), required CFI validation level, application criticality and/or the like. To maintain the sliding window, the registration code segment may be configured to discard the unique identifier of a least recent (oldest) routine when registering a currently executed routine by appending its unique identifier to the runtime execution sequence. The registration code segment is configured to do so in steady state after the runtime execution sequence sliding window reached its maximum size, i.e. the predefined number of routines. Prior to the steady state while the windowed runtime execution sequence is still not fully filled, the registration code segment may simply append the unique identifier of the executed routine to the end of the windowed runtime execution sequence without removing the unique identifier of previously registered routine(s). Moreover, in case multiple valid execution paths (identified in step 106) comprise different numbers of preceding routines, the runtime execution sequence may be expressed by respective multiple rolling hash values each calculated for a different predefined number of most recently registered routines.

Moreover, in order to reduce computing resources required for updating the runtime execution sequence during runtime and support efficient pattern matching as described herein after, the runtime execution sequence may be expressed by a hash value computed by the registration code segment. In particular, the constructor 210 may configure the registration code segment to maintain the hashing paradigm employed for calculating the hash values for the valid execution path(s) by applying the same hash function(s) to calculate the hash value for the runtime execution sequence. Moreover, the constructor 210 may configure the registration code segment to use the same rolling hash function(s) for calculating a rolling hash value for the ordered pattern of the runtime execution sequence, specifically for the reduced size ordered pattern of the runtime execution sequence sliding window. Using the rolling hash function(s) for calculating the rolling hash value may significantly reduce the computing resources required for the registration code segment. This is because the registration code segment may calculate the new rolling hash value using only the previous rolling hash value, the unique identifier of the least recent routine discarded from the reduced size ordered pattern of the windowed runtime execution sequence and the unique identifier of the routine currently appended to the reduced size ordered pattern of the windowed runtime execution sequence. There is therefore no need to re-calculate the rolling hash value from scratch every time another routine is registered in the runtime execution sequence, i.e. its unique identifier is appended to the reduced size ordered pattern of the runtime execution sequence.

During runtime, when one or more processors execute the executable file(s) generated using the adjusted intermediate code file(s), the registration code segment invoked upon and/or before execution of each routine may update the runtime execution sequence by registering the respective routine to indicate the respective routine was executed. In particular, the registration code segment registers each routine by appending the unique identifier of the respective routine to the end of the runtime execution sequence. As such, at any given time the runtime execution sequence may represent an ordered pattern concatenating the unique identifiers of all routine(s) executed prior to the given time. Moreover, as described herein before, the runtime execution sequence implements the sliding window thus comprising the reduced size ordered pattern concatenating the unique identifiers of the predefined number of routines most recently executed. Optionally, in case there are multiple valid execution paths each comprising a different number of preceding routines, the registration code segment may maintain a plurality of reduced size ordered patterns each associated with another execution path sequence and concatenating the unique identifiers of a respective predefined number of routines most recently executed.

Moreover, to reduce the required storage resources, the registration code segment may calculate a hash value for the ordered pattern of the execution path sequence using the hash function(s) used to calculate the hash values for the ordered pattern(s) of the valid execution path(s). In particular, to reduce its computing resources, the registration code segment may calculate the rolling hash value for the reduced size ordered pattern of the windowed runtime execution path.

The constructor 210 may adjust the intermediate code file(s) to add the registration code segment using one or more code insertion (hooking) methods, techniques and/or implementations. For example, the constructor 210 may adjust one or more of the routines to invoke the registration code segment from within the respective routine, for example, at the beginning of the routine, at the end of the routine and/or the like. In such implementations, the constructor 210 may adjust the intermediate code file(s) to include a branch instruction (e.g. BL) at the beginning or at the end of one or more of the routines for invoking the registration code segment associated with the respective routines prior or following execution of the respective routine. In another example, the constructor 210 may insert a trampoline branch function in one or more of the routines. The trampoline branch function may be configured to invoke the registration code segment from within the respective routine prior during and/or following execution of the routine. In another example, the constructor 210 may implement the branch instruction for more or more of the routines using a respective trampoline branch function associated with the respective routine. The trampoline branch function may be configured to invoke the registration code segment prior to execution of the respective routine. After the registration code segment completes execution it may invoke the respective routine. The constructor 210 may add the trampoline branch function to be invoked instead of the respective routine by replacing the address of the respective routine in the symbol table with the address of the trampoline branch function. Therefore one or more initiating (calling) routines which call the respective routine will instead invoke the trampoline branch function. In another example, the constructor 210 may insert the registration code segment directly in one or more of the routines such that registration code segment executes upon execution of the respective routine to register the respective routine in the runtime execution sequence.

The constructor 210 may analyze the routines to identify the location for inserting the registration code segment and/or the branch instruction. In order to analyze the routines, the constructor 210 may extract the binary code of the routine(s) from the intermediate code file using the information in the symbol table entry corresponding to each routine. The constructor 210 may then apply one or more intermediate code file disassembly methods, techniques and/or tools to disassemble the routine's binary code into assembly instructions and analyze the assembly instructions. For example, the constructor 210 may utilize the "pyelftools" tool to extract the code of each routine as machine code. The constructor 210 may apply one or more tools, for example, "Capstone Disassembler" and/or the like, to disassemble the extracted machine code.

The syntax and/or opcodes of the assembly instructions may vary between processor architectures and/or instructions sets. The constructor 210 may therefore be adapted to analyze the routines to analyze the assembly instructions according to the syntax of the processor architecture and instructions set selected for generating the intermediate code file(s).

As shown at 110, the constructor 210 may adjust the intermediate code file(s) to include a flow validation code segment configured to verify that the runtime execution path which led to invocation of the respective critical routine is a valid execution path as identified for the respective critical routine in the valid execution dataset created during the analysis of the intermediate code file(s). Specifically, the flow validation code segment may be configured to verify that the runtime execution sequence updated by the registration code segment to indicate execution of the executed routine(s) matches one of the valid execution path(s) identified for the respective critical routine (during the analysis) and mapped in the valid execution dataset.

The flow validation code segment may be therefore configured to allow the processor(s) to execute one or more of the critical routine only in case the flow validation code segment verifies that the runtime execution path matches one of the valid execution path(s) associated with the respective critical routine. However, in case the flow validation code segment cannot verify that the runtime execution path is valid, the flow validation code segment may cause the processor(s) to initiate one or more predefined actions. The predefined actions may include for example, crashing execution of the processor(s), halting execution of the processor(s), causing the processor(s) to branch to a predefined address, preventing the processor(s) from executing the critical routine, generating one or more indications and/or alerts of invalid execution and/or the like.

The predefined actions may be selected according to one or more parameters of the execution flow, for example, the processor architecture, a severity and/or criticality of each routine, a user defined parameter and/or the like.

The flow validation code segment may be configured to verify the runtime execution sequence by matching between the ordered pattern of the runtime execution sequence and the ordered pattern(s) of the valid execution path(s). Based on the match (comparison), the flow validation code segment may determine whether the execution flow of the processor(s) prior to invoking the respective critical routine includes the preceding routines executed in the order defined by the valid execution path identified for the respective critical routine in the valid execution dataset. The flow validation code segment may further verify all preceding routines identified in the respective valid execution path are indeed executed in order and no additional routine(s) are inserted. In particular, the validation code segment may be configured to match the reduced size ordered pattern of the windowed runtime execution sequence to the ordered pattern(s) of the valid execution path(s). The flow validation code segment may be configured to apply one or more pattern matching methods, techniques and/or algorithms as known in the art for comparing the ordered pattern of the windowed runtime execution sequence and the ordered pattern of the valid execution path(s). The pattern matching techniques and/or algorithms may be highly efficient in terms of time and/or computing resources thus significantly reducing the computation overhead required for executing the flow validation code.

Moreover, the flow validation code segment may be configured to apply the pattern matching for verifying the runtime execution path by matching between the hash value calculated for the ordered pattern of the runtime execution sequence and the hash values calculated for the ordered pattern(s) of the valid execution path(s). In particular, the flow validation code segment may be configured to match between the rolling hash value calculated for the reduced size ordered pattern of the windowed runtime execution sequence and the hash values calculated for the ordered pattern(s) of the valid execution path(s).

During runtime, when one or more processors execute the executable file(s) generated using the adjusted intermediate code file(s), the flow validation code segment invoked upon and/or before execution of each critical routine may verify that the runtime execution sequence, in particular the windowed runtime execution sequence matches one of the valid execution path(s) identified for the respective critical routine during the analysis. As described herein before, in case the flow validation code segment verifies that the runtime execution path matches one of the valid execution path(s) associated with the respective critical routine, the flow validation segment may allow the processor(s) to execute the respective critical routine. However, in case the flow validation code segment cannot validate the runtime execution path, the flow validation code segment may cause the processor(s) to initiate one or more predefined actions.

Applying the hash functions which maintain the sum property may allow the flow validation code segment to apply one or more pattern matching methods, techniques and/or algorithms as known in the art for comparing the pattern of the runtime execution sequence and the ordered pattern of the valid execution path(s). The pattern matching techniques and/or algorithms may be highly efficient in terms of time and/or computing resources thus significantly reducing the computation overhead required for applying the flow validation code. Moreover, due to the one-to-one property of the hash functions the flow verification may be highly robust as the runtime execution sequence may be associated with a single execution path and is thus significantly immune to alterations in the execution path which may be induced by malicious party(s).

The constructor 210 may adjust the intermediate code file(s) to add the flow validation code segment using one or more code insertion (hooking) methods, techniques and/or implementations. For example, the constructor 210 may adjust one or more of the critical routine(s) to invoke the flow validation code segment from within the critical routine, for example, at the beginning of the critical routine(s). In such implementations, the constructor 210 may adjust the intermediate code file(s) to include a branch instruction (e.g. BL) at the beginning of one or more of the critical routines for invoking the flow validation code segment associated with the respective critical routine prior to execution of the respective critical routine. In another example, the constructor 210 may insert a respective trampoline branch function in one or more of the critical routines, in particular at the beginning of the critical routine(s). The trampoline branch function may be configured to invoke the flow validation code segment from within the respective critical routine prior to execution of the respective critical routine. In another example, the constructor 210 may implement the branch instruction for one or more of the critical routines using a respective trampoline branch function associated with the respective critical routine. The trampoline branch function may be configured to invoke the flow validation code segment prior to execution of the respective critical routine. After the flow validation code segment completes execution it may invoke the respective critical routine. The constructor 210 may add the trampoline branch function to be invoked instead of the respective critical routine by replacing the address of the respective critical routine in the symbol table with the address of the trampoline branch function. Therefore one or more of the preceding routines calling the respective critical routine will instead invoke the trampoline branch function associated with the respective critical routine. In another example, the constructor 210 may insert the flow validation code segment directly in one or more of the critical routine(s), in particular at the beginning of the critical routine(s) such that flow validation code segment executes prior to execution of the respective critical routine to verify the execution path prior to invocation of the respective critical routine.

A shown at 112, the constructor 210 amends data, instruction(s), symbol table(s) and/or one or more attributes of the intermediate code file(s) affected by the adjustment of the intermediate code file(s) done to include the registration code segment(s), the flow validation code segment(s), the runtime execution sequence dataset and/or the valid execution path dataset.

For example, the layout of one or more of the adjusted routines in the intermediate code file(s) as defined during the compilation of the intermediate code file(s) may change due to the insertion of the added code segments and/or the datasets (runtime dataset and valid execution path dataset) thus changing the relative locations of one or more instructions and/or data items in the adjusted routine(s). The constructor 210 may therefore analyze the disassembled code of the routine(s) to search for instructions and/or data items comprising reference(s) and/or pointer(s) to other instruction(s) and/or other data item(s). The constructor 210 may adjust the detected reference(s) and/or pointer(s) and update them according to the new layout of the routine(s) after insertion of the added code segments and/or the datasets. For example, assuming the intermediate code file(s) are compiled for the ARM architecture and instruction set, the constructor 210 may search for 'LDR Rn, [pc #offset]' which may be affected by the change of the routine's layout. The adjuster may then amend (update) the '#offset' according to the new layout of the adjusted routine to point to the correct location with respect to the 'pc' which is the program counter.

In another example, the constructor 210 may amend the symbol table of the adjusted routine(s) to reflect the changes applied to the adjusted routine(s) by the insertion of the added code segments and/or the datasets. For example, the constructor 210 may update the symbol table to include the symbols of the added code segments. The constructor 210 may further amend the symbol table to reflect the address locations of the adjusted routine(s) which may have changed due to the insertion of the added code segments and/or the datasets.

Moreover, the insertion of the added code segments as well as the insertion of the datasets may inflate the size of the respective intermediate code file. The constructor 210 may therefore adjust the adjusted intermediate file(s) to amend one or more attributes of the adjusted intermediate code file(s), for example, the file size and/or the like. For example, assuming the intermediate code file(s) are in ELF format, the constructor 210 may adjust the header of the ELF file(s) to reflect the new offsets and alignments in the routine(s) of the intermediate code file(s) after the insertion of the added code segments and/or the datasets.

The constructor 210 may include the added code and/or the dataset(s) in the adjusted intermediate files(s) themselves. Additionally and/or alternatively, the constructor 210 may include the added code and/or the list(s) in one or more additional intermediate code files. The additional intermediate code file(s) may be provided together with the adjusted intermediate code file(s) for the generation, build and/or linkage of the executable file(s).

The constructor 210 may also verify that branches to the added code segments implemented, for example, using the trampoline branch functions are valid for build and/or linkage after the intermediate code file(s) are adjusted to reflect the changes implied by the insertion of the added code segments and/or the datasets. For example, the constructor 210 may add a relocation entry for each branch to one of the added code segments where the relocation entry points to a symbol name of the respective added code segment. The relocation entry may be added to the relocation section describing the relocations for code section(s) containing the branch instruction(s), i.e. the trampoline branch functions and/or containing the branch instruction(s). If no such relocation section exists, the relocation section may be created and added to the existing sections in the intermediate file. The added relocation section may be compiled with the same predefined names in one or more of the additional intermediate code files created to include the added code segments.

As shown at 114, the constructor 210 may output the adjusted intermediate code file(s) which may be used for generating, building and/or linking one or more executable files which may be executed by one or more processors. For example, the constructor 210 may transmit the intermediate code file(s) to one or more of the remote networked resources which may use one or more applications, tools and/or the like, for example, a linker, a code builder and/or the like for creating the executable file(s) from the adjusted intermediate code file(s) to create the executable file(s). In another example, the constructor 210 may store the intermediate code file(s) in the storage 206 from where the intermediate code file(s) may be retrieved by one or more applications, tools and/or the like, for example, a linker, a code builder and/or the like for creating the executable file(s). In another example, the constructor 210 may store the intermediate code file(s) in one or more of the attachable storage devices which may be attached to another system where the intermediate code file(s) may be retrieved by one or more applications, tools and/or the like, for example, a linker, a code builder and/or the like for creating the executable file(s).

It is expected that during the life of a patent maturing from this application many relevant systems, methods and computer programs will be developed and the scope of the terms intermediate code files format, intermediate code files analysis tools are intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of generating compiled intermediate code files adjusted to apply execution control flow verification, comprising:
   receiving at least one intermediate code file generated by a compiler, the at least one intermediate code file comprising a plurality of routines;
   adjusting the at least one intermediate code file prior to generation of a respective executable file to be executed by at least one processor, the adjusting comprising:
      identifying at least one valid execution path leading to execution of at least one critical routine of the plurality of routines, the at least one valid execution path identified by analyzing the at least one intermediate code file describes an order of execution of each preceding routine of the plurality of routines executed prior to execution of the at least one critical routine, the at least one valid execution path is expressed by a hash value calculated, using at least one rolling hash function, for an ordered pattern concatenating a unique identifier assigned to each preceding routine in the order of execution,
      adding a registration code segment configured to register execution of each executed routine of the plurality of routines in a runtime execution sequence, the registration code segment registers the execution by:
         appending, upon execution of the respective routine, the unique identifier of the respective routine to an ordered pattern expressing the runtime execution sequence,
         creating a reduced size ordered pattern expressing the runtime execution, sequence created by applying a sliding window on the ordered pattern, and
         calculating a hash value for the runtime execution sequence by calculating, using the at least one rolling hash function, a rolling hash value for the reduced size ordered pattern, and
      adding a flow validation code segment configured to verify the runtime execution sequence against the at least one valid execution path before invocation of the at least one critical routine, the flow validation code segment verifies the runtime execution by verifying a match between the rolling hash value calculated for the runtime execution sequence and the hash value calculated for the at least one valid execution path; and
   outputting the at least one adjusted intermediate code file;
   wherein, in runtime, in case the runtime execution sequence updated by the registration code segment does not match the at least one valid execution path, the flow validation code segment causes the at least one processor to initiate at least one predefined action.

2. The method of claim 1, wherein the at least one intermediate code file is a member of a group consisting of: an object file, an archive file and a binary file.

3. The method of claim 1, wherein each of the plurality of routines is a member of a group consisting of: a routine, a sub-routine and a function.

4. The method of claim 1, wherein the plurality of routines are identified by analyzing a symbol table of the at least one intermediate code file to identify routine symbols.

5. The method of claim 1, wherein the at least one valid execution path is identified by analyzing a control flow graph generated for the at least one intermediate code file.

6. The method of claim 1, wherein the at least one critical routine is manually defined as critical by at least one expert, the expert is a member of a group consisting of: a developer, an operator and a user.

7. The method of claim 1, wherein the at least one critical routine is automatically defined as critical based on the analysis of the at least one intermediate code file.

8. The method of claim 1, wherein the at least one predefined action is a member of a group consisting of: crashing execution of the at least one processor, halting execution of the at least one processor, causing the at least one processor to branch to a predefined address in the at least one intermediate code file, preventing the at least one processor from executing the at least one critical routine and generating an indication of an invalid execution path.

9. The method of claim 1, wherein the registration code segment and the flow validation code segment are added to the at least one intermediate code file by replacing a branch instruction to at least one of the plurality of routines with a trampoline branch function configured to invoke the respective added code segment before invocation of the at least one routine.

10. The method of claim 1, wherein the registration code segment and the flow validation code segment are added to the at least one intermediate code file by inserting a trampoline branch function in at least one of the of the plurality of routines, the trampoline branch function is configured to invoke the respective added code segment from within the at least one routine.

11. The method of claim 1, wherein the at least one intermediate code file is adjusted to amend at least one of: an instruction and a data element affected by the addition of the added code segments.

12. The method of claim 1, wherein the at least one intermediate code file is amended to update its symbol table to reflect the added code segments and an increase to size of the adjusted routines.

13. A system for generating compiled intermediate code files adjusted to apply execution control flow verification, comprising:
 a program store storing a code; and
 at least one constructing processor coupled to the program store for executing the stored code, the code comprising:
  code instructions to receive at least one intermediate code file generated by a compiler, the at least one intermediate code file comprising a plurality of routines;
  code instructions to adjust the at least one intermediate code file prior to generation of a respective executable file to be executed by at least one executing processor, the adjusting comprising:
   identifying at least one valid execution path leading to execution of at least one critical routine of the plurality of routines, the at least one valid execution path identified by analyzing the at least one intermediate code file describes an order of execution of each preceding routine of the plurality of routines executed prior to execution of the at least one critical routine, the at least one valid execution path is expressed by a hash value calculated, using at least one rolling hash function, for an ordered pattern concatenating a unique identifier assigned to each preceding routine in the order of execution,
   adding a registration code segment configured to register execution of each executed routine of the plurality of routines in a runtime execution sequence the registration code segment registers the execution by:
    appending, upon execution of the respective routine, the unique identifier of the respective routine to an ordered pattern expressing the runtime execution sequence,
    creating a reduced size ordered pattern expressing the runtime execution, sequence created by applying a sliding window on the ordered pattern, and
    calculating a hash value for the runtime execution sequence by calculating, using the at least one rolling hash function, a rolling hash value for the reduced size ordered pattern, and
   adding a flow validation code segment configured to verify the runtime execution sequence against the at least one valid execution path before invocation of the at least one critical routine, the flow validation code segment verifies the runtime execution by verifying a match between the rolling hash value calculated for the runtime execution sequence and the hash value calculated for the at least one valid execution path; and
  code instructions to output the at least one adjusted intermediate code file;
 wherein, in runtime, in case the runtime execution sequence updated by the registration code segment does not match the at least one valid execution path, the flow validation code segment causes the at least one executing processor to initiate at least one predefined action.

14. A computer program product implemented with execution control flow verification, comprising:
 a non-transitory computer readable storage medium;
 first program instructions of a registration code segment created for each of a plurality of routines of an executable file generated from at least one intermediate code file adjusted to support execution control flow verification, the registration code segment is configured to register execution of the respective routine in a runtime execution sequence describing an order of runtime execution of each routine executed prior to execution of at least one critical routine of the plurality of routines by calculating, using at least one rolling hash function, a rolling hash value for a reduced size ordered pattern of the runtime execution sequence created by applying a sliding window on an ordered pattern expressing the runtime execution sequence appended with a unique identifier of each executed routine of the plurality of routines upon execution of the respective routine;
 second program instructions of a flow validation code segment created for the at least one critical routine and configured to verify the runtime execution sequence against at least one valid execution path before invocation of the at least one critical routine, the at least one valid execution path is expressed by a hash value calculated, using at least one rolling hash function, for an ordered pattern concatenating a unique identifier assigned to each preceding routine in the order of execution, the flow validation code segment is configured to verify the runtime execution sequence by verifying a match between the rolling hash value calculated for the runtime execution sequence and the hash value calculated for the at least one valid execution path, in case the runtime execution sequence updated by the registration code segment does not match the at least one valid execution path the flow validation code segment causes initiation of at least one predefined action, the at least one valid execution path describing an order of execution of each preceding routine executed prior to execution of the at least one critical routine is identified during an analysis of the at least one intermediate code file; and
 a plurality of program instructions each of a respective one of the plurality of routines to execute an original functionality of the plurality of routines as coded prior to the adjustment of the at least one intermediate code file;
 wherein the first, second and the plurality of program instructions are executed by at least one processor from the non-transitory computer readable storage medium.

* * * * *